(12) United States Patent
Sakaguchi et al.

(10) Patent No.: US 11,792,539 B2
(45) Date of Patent: Oct. 17, 2023

(54) SOLID-STATE IMAGING ELEMENT, READING DEVICE, IMAGE PROCESSING APPARATUS, AND CONTROL METHOD

(71) Applicants: Shinji Sakaguchi, Kanagawa (JP); Masamoto Nakazawa, Kanagawa (JP)

(72) Inventors: Shinji Sakaguchi, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 110 days.

(21) Appl. No.: 17/352,379

(22) Filed: Jun. 21, 2021

(65) Prior Publication Data

US 2021/0409622 A1 Dec. 30, 2021

(30) Foreign Application Priority Data

Jun. 25, 2020 (JP) ................................ 2020-109376

(51) Int. Cl.
*H04N 25/44* (2023.01)
*H04N 1/028* (2006.01)
*H04N 25/11* (2023.01)

(52) U.S. Cl.
CPC ......... *H04N 25/44* (2023.01); *H04N 1/02805* (2013.01); *H04N 25/11* (2023.01)

(58) Field of Classification Search
CPC .... H04N 25/44; H04N 1/02805; H04N 25/11; H04N 25/131; H04N 25/617; H04N 25/701; H04N 25/621; H04N 1/028; H04N 1/02815; H04N 1/02895; H04N 1/04; H04N 23/74; H04N 25/75; H04N 25/76; H04N 25/77
See application file for complete search history.

(56) References Cited

U.S. PATENT DOCUMENTS

| 9,030,581 | B2 * | 5/2015 | Kasai ..................... H04N 25/57 |
| | | | 348/294 |
| 10,277,846 | B2 * | 4/2019 | Asaba ..................... H04N 25/75 |
| 2007/0188638 | A1 | 8/2007 | Nakazawa et al. |
| 2008/0252787 | A1 | 10/2008 | Nakazawa et al. |
| 2009/0074330 | A1 | 3/2009 | Hamada et al. |
| 2010/0027061 | A1 | 2/2010 | Nakazawa |
| 2010/0171998 | A1 | 7/2010 | Nakazawa |
| 2011/0026083 | A1 | 2/2011 | Nakazawa |

(Continued)

FOREIGN PATENT DOCUMENTS

| EP | 2 998 995 A2 | 3/2016 |
| JP | 2000-350103 A | 12/2000 |

(Continued)

OTHER PUBLICATIONS

Extended European Search Report dated Nov. 23, 2021 in European Patent Application No. 21180110.5, 9 pages.

(Continued)

*Primary Examiner* — Seung C Sohn
(74) *Attorney, Agent, or Firm* — XSENSUS LLP

(57) ABSTRACT

A solid-state imaging element includes a pixel section including a plurality of pixels that are arranged in a matrix and to perform photoelectric conversion, and circuitry to perform reading control on pixels in the pixel section, such that reading control is not performed on at least one pixel included in the pixel section.

19 Claims, 10 Drawing Sheets

(56) References Cited

U.S. PATENT DOCUMENTS

| | | |
|---|---|---|
| 2011/0051201 A1 | 3/2011 | Hashimoto et al. |
| 2011/0063486 A1 | 3/2011 | Nakazawa |
| 2012/0113486 A1 | 5/2012 | Masuda |
| 2012/0224205 A1 | 9/2012 | Nakazawa |
| 2013/0063792 A1 | 3/2013 | Nakazawa |
| 2014/0029065 A1 | 1/2014 | Nakazawa |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0222790 A1 | 8/2015 | Asaba et al. |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0088179 A1 | 3/2016 | Nakazawa et al. |
| 2016/0112660 A1 | 4/2016 | Nakazawa et al. |
| 2016/0119495 A1 | 4/2016 | Konno et al. |
| 2016/0173719 A1 | 6/2016 | Hashimoto et al. |
| 2016/0268330 A1 | 9/2016 | Nakazawa et al. |
| 2016/0295138 A1 | 10/2016 | Asaba et al. |
| 2016/0373604 A1 | 12/2016 | Hashimoto et al. |
| 2017/0019567 A1 | 1/2017 | Konno et al. |
| 2017/0163836 A1 | 6/2017 | Nakazawa |
| 2017/0170225 A1 | 6/2017 | Asaba et al. |
| 2017/0201700 A1 | 7/2017 | Hashimoto et al. |
| 2017/0256580 A1 | 9/2017 | Sakaguchi et al. |
| 2017/0272671 A1 | 9/2017 | Sakaguchi et al. |
| 2017/0295298 A1 | 10/2017 | Ozaki et al. |
| 2017/0302821 A1 | 10/2017 | Sasa et al. |
| 2017/0324883 A1 | 11/2017 | Konno et al. |
| 2018/0146150 A1 | 5/2018 | Shirado et al. |
| 2018/0175096 A1 | 6/2018 | Inoue et al. |
| 2018/0213124 A1 | 7/2018 | Yokohama et al. |
| 2018/0261642 A1 | 9/2018 | Asaba et al. |
| 2019/0163112 A1 | 5/2019 | Nikaku et al. |
| 2019/0208149 A1 | 7/2019 | Asaba et al. |
| 2019/0238702 A1 | 8/2019 | Ikemoto et al. |
| 2019/0268496 A1 | 8/2019 | Nakazawa et al. |
| 2019/0289163 A1 | 9/2019 | Hashimoto et al. |
| 2019/0327387 A1 | 10/2019 | Hashimoto et al. |
| 2019/0335061 A1 | 10/2019 | Nakazawa et al. |
| 2020/0053229 A1 | 2/2020 | Hashimoto et al. |
| 2020/0053230 A1 | 2/2020 | Nakazawa et al. |
| 2020/0053233 A1 | 2/2020 | Nakazawa et al. |
| 2020/0120225 A1 | 4/2020 | Oyama et al. |
| 2020/0120228 A1 | 4/2020 | Ozaki et al. |
| 2020/0410271 A1 | 12/2020 | Nakazawa et al. |
| 2020/0412904 A1 | 12/2020 | Ohmiya et al. |
| 2021/0014441 A1 | 1/2021 | Ohmiya et al. |
| 2021/0021729 A1 | 1/2021 | Hashimoto et al. |

FOREIGN PATENT DOCUMENTS

| | | |
|---|---|---|
| JP | 2006-310932 | 11/2006 |
| JP | 2011-259492 | 12/2011 |
| JP | 2017-158178 | 9/2017 |
| WO | 2019/049923 A1 | 3/2019 |

OTHER PUBLICATIONS

U.S. Appl. No. 16/952,103, filed Nov. 19, 2020, Tatsuya Ozaki, et al.

U.S. Appl. No. 17/161,704, filed Jan. 29, 2021 Shogo Nakamura, et al.

* cited by examiner

SOLID-STATE IMAGING ELEMENT, READING DEVICE, IMAGE PROCESSING APPARATUS, AND CONTROL METHOD

CROSS-REFERENCE TO RELATED APPLICATIONS

This patent application is based on and claims priority pursuant to 35 U.S.C. § 119(a) to Japanese Patent Application No. 2020-109376, filed on Jun. 25, 2020, in the Japan Patent Office, the entire disclosure of which is hereby incorporated by reference herein.

BACKGROUND

Technical Field

The present disclosure relates to a solid-state imaging element, a reading device, an image processing apparatus, and a control method.

Description of the Related Art

Recently developed solid-state imaging elements using image sensors include a three-line image sensor in which pixels of red, green, and blue (RGB) are arranged and a four-line image sensor capable of reading invisible light such as near infrared (NIR) in addition to visible light of such as RGB.

The four-line image sensor can simultaneously read visible light and invisible light. Thus, excessive read information such as dust on a document can be eliminated. Alternatively, invisible but meaningful information can be embedded in a document in advance and the information can be read.

There is a technology for preventing occurrence of blooming by performing reset processing on upper and lower rows of a region to be read with an area sensor.

SUMMARY

According to at least one embodiment of the present disclosure, a solid-state imaging element includes a pixel section and circuitry. The pixel section includes a plurality of pixels that are arranged in a matrix and that perform photoelectric conversion. The circuitry performs reading control on pixels in the pixel section, such that reading control is not performed on at least one pixel included in the pixel section.

According to at least one embodiment of the present disclosure, a control method executable by a solid-state imaging element including a pixel section including a plurality of pixels that are arranged in a matrix and configured to perform photoelectric conversion, includes performing reading control on pixels in the pixel section, such that reading control is not performed on at least one pixel included in the pixel section.

DETAILED DESCRIPTION

Hereinafter, embodiments of a solid-state imaging element, a reading device, an image processing apparatus, and a control method will be described in detail referring to the accompanying drawings.

An image sensor of related art including a plurality of lines operates all lines even when information on part of the arranged lines is required, and selectively uses required image data among the obtained image data.

However, such image sensor including the plurality of lines has a disadvantage that an optimum processor is not provided for processing on a non-required line or processing on image data obtained from the non-required line.

For example, charges generated in pixels in a non-required region are reset at the timing of image reading from a required region. There is a disadvantage that noise caused by the reset processing operation on the pixels in the non-required region may affect reading of the pixels in the required region.

In view of this, according at least one embodiment, a solid-state imaging element, a reading device, an image processing apparatus, and a control method are provided, with increased quality of an image generated based on a group of pixels corresponding to image data.

First Embodiment

Figure 1:
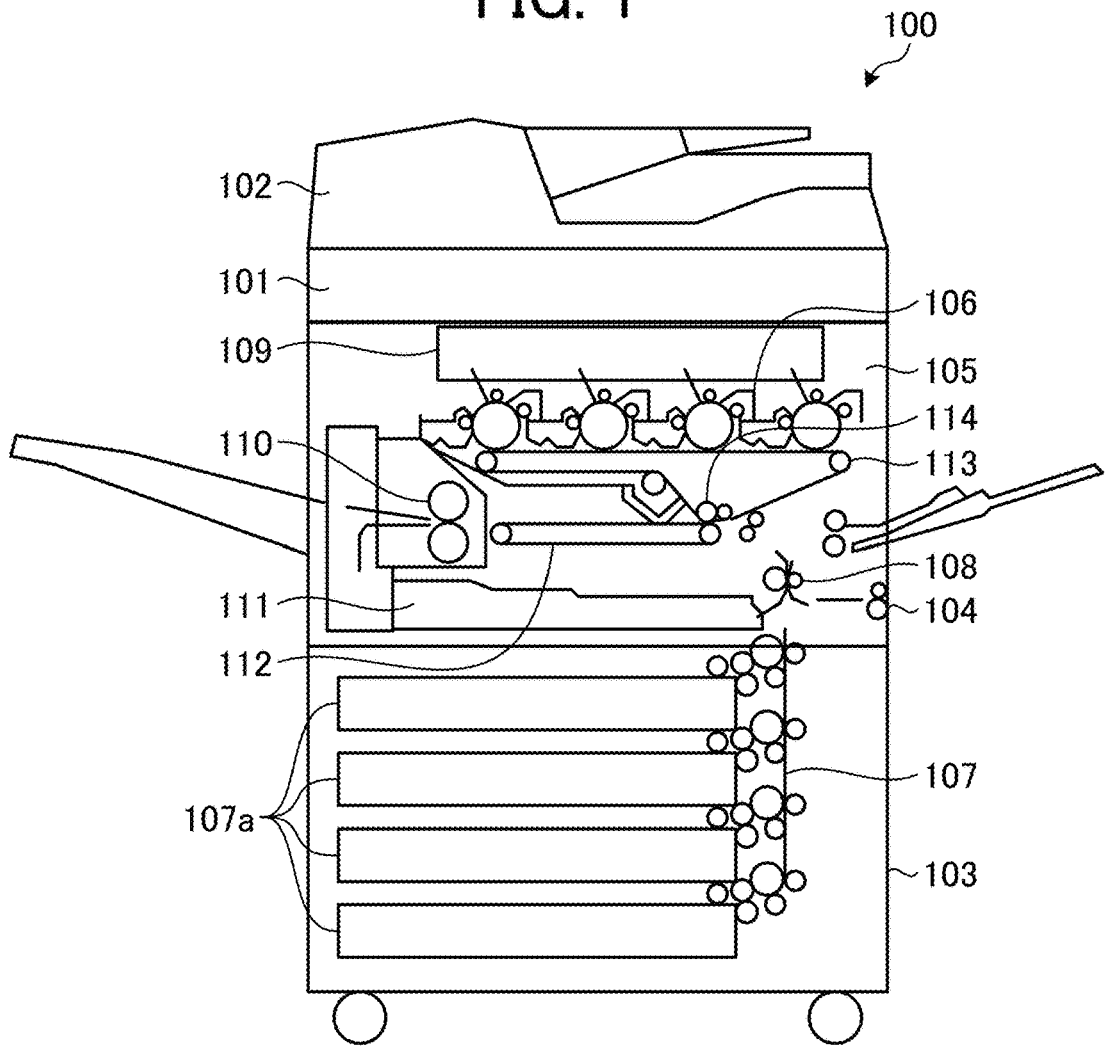
FIG. 1 illustrates a configuration of an example of an image forming apparatus according to a first embodiment.

FIG. 1 illustrates a configuration of an example of an image forming apparatus 100 according to a first embodiment. In FIG. 1, the image forming apparatus 100 serving as an image processing apparatus is generally referred to as a multifunction peripheral having at least two functions of a copy function, a print function, a scan function, and a facsimile function.

The image forming apparatus 100 includes an image reading device 101 serving as a reading device, an automatic document feeder (ADF) 102, and an image forming section 103 in a lower portion of the image forming apparatus 100. To describe an internal configuration of the image forming section 103, FIG. 1 illustrates the internal configuration of the image forming section 103 from which an external cover thereof has been removed.

The ADF 102 is a document supporter that positions, at a reading position, a document or an original including an image to be read. The ADF 102 automatically feeds the document placed on a table to the reading position. The image reading device 101 reads the document fed by the ADF 102 at the predetermined reading position. The image reading device 101 includes in an upper surface thereof a contact glass serving as a document supporter on which the document is placed. The image reading device 101 reads the document on the contact glass, that is, at the reading position. Specifically, the image reading device 101 is a scanner that includes a light source, an optical system, and a solid-state imaging element such as a complementary metal oxide semiconductor (CMOS) image sensor therein. In the image reading device 101, the light source emits light to illuminate the document. The light reflected from the document passes through the optical system and reaches the solid-state imaging element, which reads the light. Thus, the image reading device 101 reads an image of the document.

The image forming section 103 includes a manual feed roller pair 104 through which a recording medium is manually inserted and a recording medium supply unit 107 that supplies a recording medium. The recording medium supply unit 107 includes an assembly that sends out recording media one by one from vertically-aligned recording medium feed cassettes 107a. The recording medium thus supplied is sent to a secondary transfer belt 112 via a registration roller pair 108.

A transfer section 114 transfers a toner image from an intermediate transfer belt 113 onto the recording medium conveyed on the secondary transfer belt 112.

The image forming section 103 also includes an optical writing device 109, an image forming unit 105 employing a tandem system, the intermediate transfer belt 113, and the secondary transfer belt 112. Specifically, in an image forming process, the image forming unit 105 renders a latent image written by the optical writing device 109 visible as a toner image and forms the toner image on the intermediate transfer belt 113.

Specifically, the image forming unit 105 includes four rotatable, drum-shaped photoconductors to form yellow, magenta, cyan, and black (Y, M, C, and K) toner images on the four photoconductors, respectively. Each of the four photoconductors is surrounded by various pieces of image forming equipment 106 including a charging roller, a developing device, a primary transfer roller, a cleaner unit, and a neutralizer. The pieces of image forming equipment 106 function around each of the four photoconductors to form a toner image on the corresponding photoconductor and transfer the toner image onto the intermediate transfer belt 113. Specifically, the primary transfer rollers transfer the toner images from the respective photoconductors onto the intermediate transfer belt 113. As a consequence, a composite toner image is formed on the intermediate transfer belt 113.

The intermediate transfer belt 113 is entrained around a drive roller and a driven roller and disposed so as to pass through primary transfer nips between the four photoconductors and the respective primary transfer rollers. As the intermediate transfer belt 113 rotates, the composite toner image constructed of the toner images primary-transferred onto the intermediate transfer belt 113 is conveyed to the secondary transfer device. The secondary transfer device 114 secondary-transfers the composite toner image onto the recording medium on the secondary transfer belt 112. As the secondary transfer belt 112 rotates, the recording medium is conveyed to a fixing device 110. The fixing device 110 fixes the composite toner image as a color image onto the recording medium. Finally, the recording medium is discharged onto an output tray disposed outside a housing of the image forming apparatus 100. Note that, in the case of duplex printing, a reverse assembly 111 reverses the front and back sides of the recording medium and sends out the reversed recording medium onto the secondary transfer belt 112.

Note that the image forming section 103 is not limited to an electrophotographic image forming section that forms an image by electrophotography as described above. Alternatively, the image forming section 103 may be an inkjet image forming section that forms an image in an inkjet printing system.

Now, the image reading device 101 is described.

Figure 2:
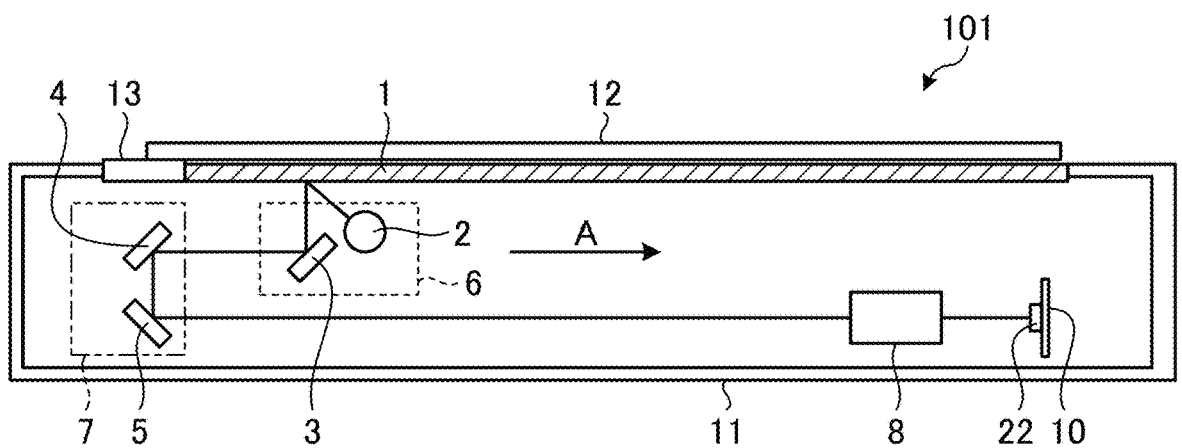
FIG. 2 is a sectional view illustrating an example of a structure of an image reading device.

FIG. 2 is a sectional view illustrating an example of a structure of the image reading device 101. As illustrated in FIG. 2, the image reading device 101 includes, in a main body 11, a sensor substrate 10 provided with a solid-state imaging element 22, a lens unit 8, a first carriage 6, and a second carriage 7. The first carriage 6 includes a light source 2, which is a light emitting diode (LED), and a mirror 3. The second carriage 7 includes mirrors 4 and 5. The image reading device 101 further includes a contact glass 1 and a reference white plate 13 in an upper surface of the image reading device 101. The light source 2 includes a light source suitable for the purpose of use, such as a white light source for a visible image or a near infrared (NIR) light source for an invisible image.

In a reading operation, the image reading device 101 emits light upward from the light source 2 while moving the first carriage 6 and the second carriage 7 from standby positions (home positions), in a sub-scanning direction (A direction). Then, the first carriage 6 and the second carriage 7 form an image of the reflected light from a document 12, on the solid-state imaging element 22 via the lens unit 8.

When the power is turned on, the image reading device 101 reads reflected light from the reference white plate 13 and sets a reference. Specifically, the image reading device 101 moves the first carriage 6 to a position directly below the reference white plate 13, turns on the light source 2, and causes the reflected light from the reference white plate 13 to form an image on the solid-state imaging element 22, thereby performing a gain adjustment.

The solid-state imaging element 22 is capable of imaging visible and invisible wavelength ranges. In the solid-state imaging element 22, pixels for converting the intensity of incident light into an electric signal are arranged. The pixels are arranged in a matrix, and electrical signals (pixel reading signals) obtained from the pixels are transferred to a digital signal processor 225 (see FIG. 3) in a subsequent stage in predetermined order at regular time intervals. A color filter that transmits light having a specific wavelength is disposed on each pixel. In the solid-state imaging element 22 of the present embodiment, each signal obtained from a pixel group in which the same color filter is arranged is referred to as a channel. In the present embodiment, an image captured by the solid-state imaging element 22 through irradiation with visible light is referred to as a visible image, and an image captured by the solid-state imaging element 22 through irradiation with invisible light such as near infrared light is referred to as an invisible image.

Note that although the image reading device of a reduction optical system is applied as the image reading device 101 of the present embodiment, the image reading device is not limited thereto, and may be of an equal magnification optical system (contact optical system: CIS system).

Figure 3:
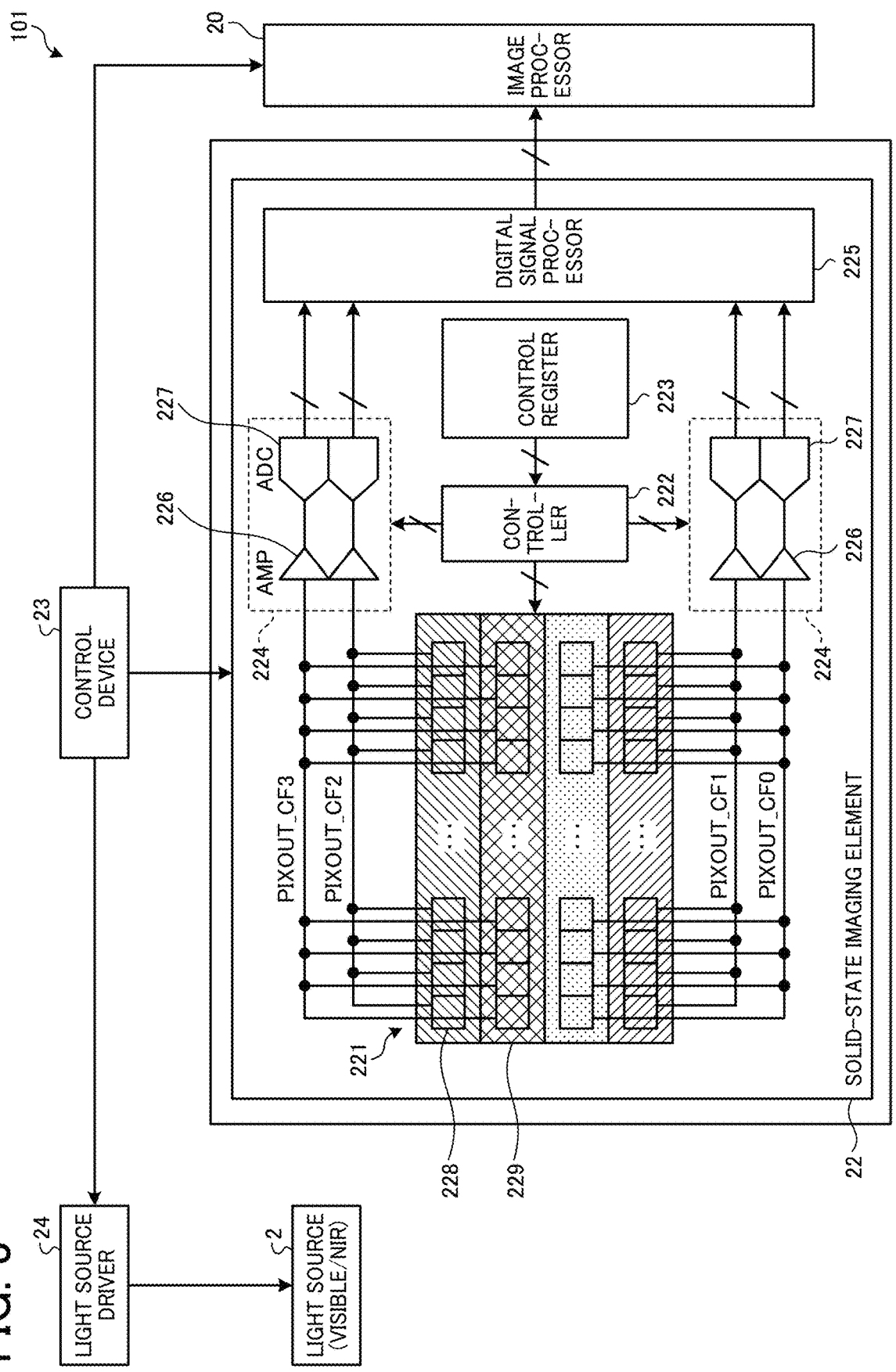
FIG. 3 is a block diagram illustrating electric connection of respective components constituting the image reading device.

FIG. 3 is a block diagram illustrating electric connection of components constituting the image reading device 101. As illustrated in FIG. 3, the image reading apparatus 101 includes an image processor 20, a control device 23, and a light source driver 24 in addition to the solid-state imaging element 22 and the light source 2 described above. The light source driver 24 drives the light source 2.

The solid-state imaging element 22 is a sensor for a reduction optical system, and is, for example, a CMOS image sensor. The solid-state imaging element 22 includes a pixel section 221, a controller 222, a control register 223, an analog-to-digital (AD) converter 224, and a digital signal processor 225.

In this embodiment, the solid-state imaging element 22 having a four-line configuration is described as an example, but the number of lines is not limited to four. In addition, the circuit configuration of the stage subsequent to the pixel section 221 is not limited to the illustrated configuration.

The pixel section 221 includes pixel groups of four lines in which a plurality of pixel circuits 228 constituting pixels are arranged in a matrix. In addition, in the pixel section 221, color filters (CF) 229 different for respective rows are arranged on the pixel groups of the four lines and transmit light in specific wavelength ranges. The color filters 229 are disposed to separate incident light into light in different wavelength bands. For example, color filters 229 optimum for the purpose of image acquisition including at least one type of RGB-CF, YMCK-CF, and NIR-CF are disposed.

Each pixel circuit 228 of the pixel section 221 is controlled by the controller 222 or the control register 223. The controller 222 or the control register 223 is controlled by the control device 23.

The AD converter 224 includes an amplification (AMP) circuit 226 and an AD conversion circuit 227, and converts a signal output from the pixel section 221 into a digital signal. The digital signal processor 225 processes the digital signal converted by the AD converter 224 as required. The AD converter 224 and the digital signal processor 225 each functions as a processor (processing circuit) that processes a signal obtained from the pixel section 221, and are controlled by the controller 222 or the control register 223.

Reset levels and signal levels (PIXOUT_CF0 to PIXOUT_CF3) generated by the respective pixel circuits 228 of the pixel section 221 are sequentially read along, for example, the arrangement positions in the main scanning direction. The difference between a read reset level and a read signal level is amplified by the AMP circuit 226 of the AD converter 224. The amplified difference level is converted into a digital signal by the AD conversion circuit 227 of the AD converter 224. The converted digital signal (image data) is processed by the digital signal processor 225 as required, and is transferred to the image processor 20 disposed in the subsequent stage.

The image processor 20 executes various types of image processing according to the purpose of use of the image data.

Although the solid-state imaging element 22 includes the digital signal processor 225 in the present embodiment, the solid-state imaging element 22 does not have to include the digital signal processor 225, and the digital signal processor 225 may be provided outside the solid-state imaging element 22. Moreover, the AD converter 224 and the control register 223 may be provided outside the solid-state imaging element 22.

Next, the pixel circuit 228 of the pixel section 221 will be described.

Figures 4, 5:
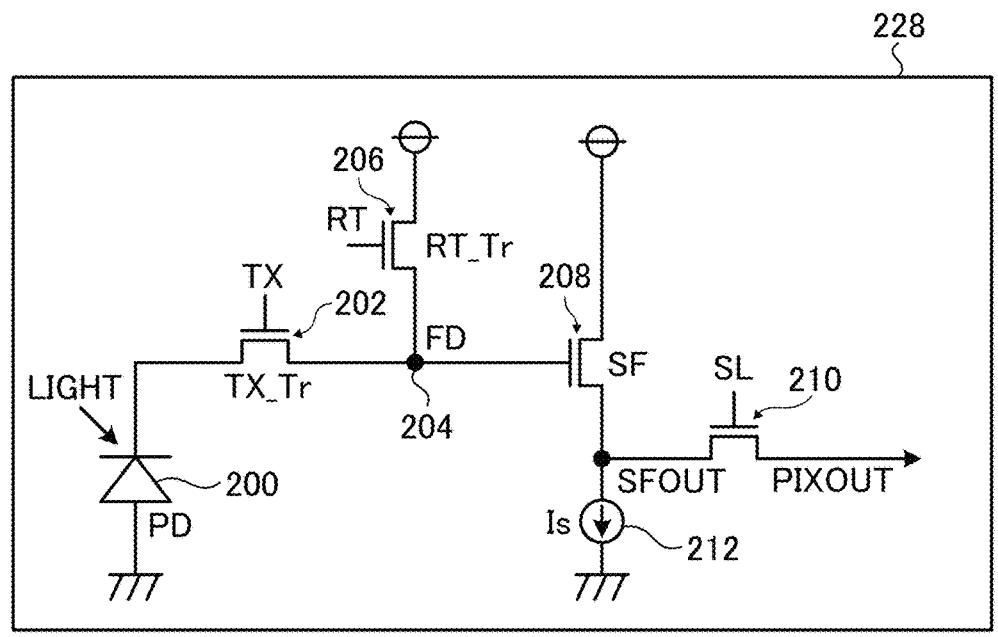
FIG. 4 illustrates a configuration example of a pixel circuit.
FIG. 5 illustrates timing control for transfer in pixel circuits.

FIG. 4 illustrates a configuration example of the pixel circuit 228. The illustrated example of the pixel circuit 228 has a four-transistor configuration including a photodiode (PD) 200, a charge transfer transistor (TX_Tr) 202, a floating diffusion (FD) 204 that performs charge-voltage conversion, a reset transistor (RT_Tr) 206 that resets the FD 204, a source follower circuit (SF circuit) 208 that buffers and outputs a signal to the subsequent stage, a selection control switch (SL) 210 that controls signal output to a PIXOUT line, and a current source (Is) 212 that supplies a bias current to the SF circuit 208. The PD 200 is an example of a "light receiving element". The PD 200 photoelectrically converts incident light to generate a charge, and accumulates the charge corresponding to the intensity of incident light. The PD 200 is, for example, an embedded photodiode. The TX_Tr 202, the RT_Tr 206, the SF circuit 208, and the SL 210 are four transistors (for example, MOS field effect transistor (MOSFET)). The connection relationship in the pixel circuit 228 is as follows.

The anode of the PD 200 is grounded, and the cathode thereof is connected to the drain of the TX_Tr 202. The drain of the TX_Tr 202 is connected to the cathode of the PD 200 and the source thereof is connected to the FD 204. The drain of the RT_Tr 206 is connected to a voltage VDD and the source thereof is connected to the FD 204. The gate of the SF circuit 208 is connected to the FD 204, the drain thereof is connected to the voltage VDD, and the source thereof is connected to the drain of the SL 210. The drain of the SL 210 is connected to the source of the SF circuit 208, and a pixel signal (voltage) is output from the source of the SL 210 to the AD converter 224 (see FIG. 3).

The controller 222 (see FIG. 3) applies a pulse voltage as a control signal to the gate of the TX_Tr 202, the gate of the RT_Tr 206, or the gate of the SL 210 to operate the pixel circuit 228.

The basic operation of the pixel circuit 228 will be described below. First, the PD 200 performs photoelectric conversion to generate and accumulate a charge corresponding to the intensity of incident light. The charge accumulated in the PD 200 is transferred from the PD 200 to the FD 204 (floating diffusion region) by switching on the TX_Tr 202. The FD 204 converts the charge generated by the PD 200 into a voltage.

The SF circuit 208 operates as follows. The SF circuit 208 amplifies the voltage of the signal level of the FD 204 and outputs the amplified voltage as a pixel signal (voltage) SFOUT. After the signal level of the FD 204 is output as the SFOUT, the signal level of the FD 204 is reset by switching on the RT_Tr 206, and is initialized to a predetermined level. The pixel signal SFOUT is transferred as PIXOUT by switching on the SL 210, and further passes through the AD converter 224 and the like to be image data.

Timing control for transfer will be described below. For easier understanding, it is assumed that four lines of the pixel circuits 228 are arranged in a matrix.

FIG. 5 illustrates timing control for transfer in the pixel circuits 228. As illustrated in FIG. 5, the controller 222 controls an RT signal and a TX signal in this order at a predetermined reading interval (hereinafter, referred to as line period).

When the RT signal is asserted, the FD 204 is initialized to a predetermined level (reset level). The TX signal is then asserted and the charge generated in the PD 200 is transferred to the FD 204 via the TX_Tr 202.

Since the level of the FD 204 after the TX signal is asserted decreases by a level corresponding to the amount of charge generated in the PD 200 with reference to the reset level, the AD converter 224 performs AD conversion on the difference between the reset level and the signal level to obtain the amount of charge generated during the above-described line period, that is, the intensity of incident light.

The image reading device 101 does not necessarily require image data of all the mounted pixel groups. For example, when an image sensor having the RGB-CF as the color filters 229 reads monochrome image data, it is sufficient to read image data from one pixel group among pixel groups provided with the three RGB color filters 229. In addition, for example, like a case where part of a document to be read is read, it is sufficient to read image data from at least one pixel group among pixel groups provided with the same color filter 229.

In particular, in the present embodiment, the image reading device 101 capable of simultaneously acquiring a visible image captured through irradiation with visible light of such as RGB and an invisible image captured through irradiation with invisible light such as NIR is applied. Depending on the purpose of use, the image reading device 101 may be required to acquire a visible image captured through irradiation with visible light of such as RGB or an invisible image captured through irradiation with invisible light such as NIR.

However, when image data obtained from at least one pixel group included in a specific line among a plurality of mounted pixel groups is acquired, unless processing on a non-required pixel group is appropriately performed, the quality of an image obtained from a required pixel group is deteriorated with respect to image quality that is expected to be obtained because of the influence of noise caused by processing on the non-required pixel group. In addition, it is not desirable from the viewpoint of power consumption to normally operate the processing circuit of the non-required pixel group. Hereinafter, the cause of the deterioration in image quality will be described.

First, deterioration in image quality due to charge transfer (charge crosstalk) in the silicon layer of the pixel circuits 228 will be described.

Figure 6:
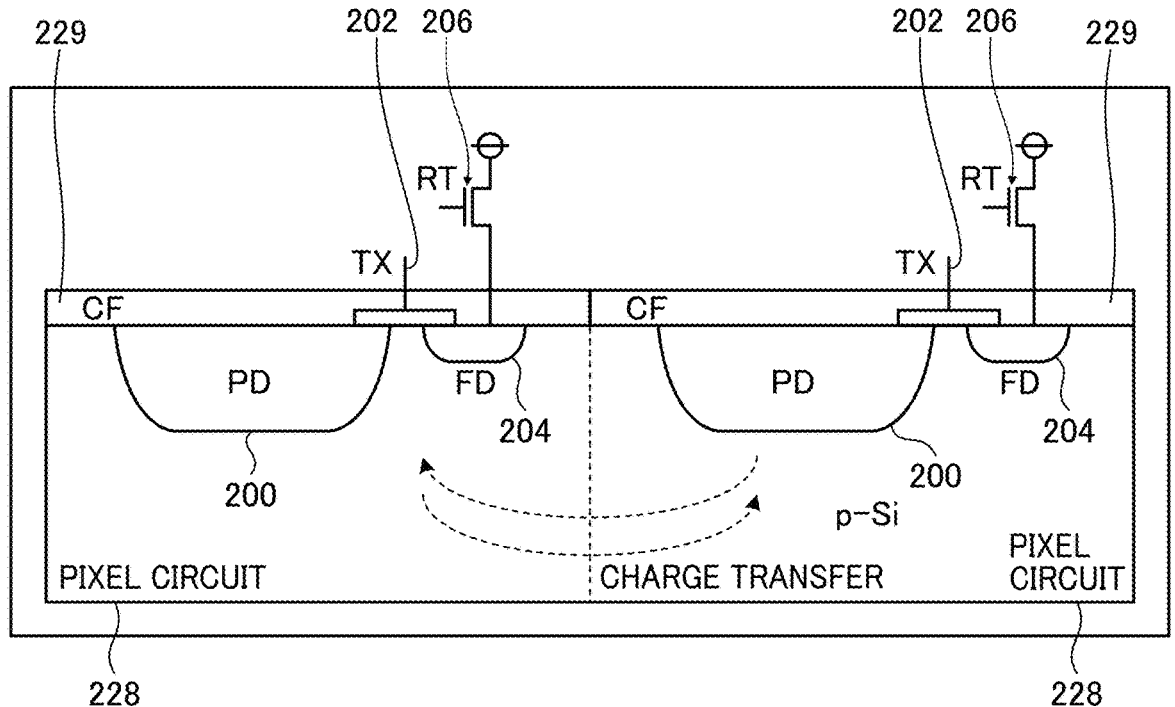
FIG. 6 illustrates charge transfer (charge crosstalk) in a silicon layer of the pixel circuits.

FIG. 6 illustrates charge transfer (charge crosstalk) in the silicon layer of the pixel circuits 228. FIG. 6 illustrates charge transfer in the silicon layer between pixel circuits 228 adjacent to each other in the row or column direction.

More particularly, as illustrated in FIG. 6, in a pixel circuit 228, photoelectric conversion is performed and a charge is generated as long as light is incident. The generated charge transfers to a lower portion of another PD 200 via the silicon layer under the PD 200. For example, when a charge caused by R light is generated in the pixel circuit 228 provided with the color filter 229 that transmits R light and transfers to a lower portion of the pixel circuit 228 provided with the color filter 229 that transmits G light, it is desirable to treat a charge caused by G light as an effective photoelectric conversion result, however the charge caused by R light is mixed. Such mixing of charges is handled as mixing of colors due to a charge crosstalk component.

Since photoelectric conversion is performed at a deeper position in the silicon layer as the wavelength of light incident on the PD 200 is longer, the charge crosstalk component increases when long-wavelength light such as NIR light is incident compared to when short-wavelength light such as visible light is incident. For example, in a case where pixel groups provided with color filters that transmit light in respective wavelength bands of R, G, B, and NIR are formed, since the NIR color filter among the provided color filters is a color filter that transmits light in the maximum wavelength band, the charge crosstalk component from the NIR pixel group to the other pixel groups is the largest. Similarly, when pixel groups provided with color filters that transmit light in respective wavelength bands of R, G, and B are formed, the charge crosstalk component from the R pixel group to the other pixel groups is the largest.

Normally, a pixel circuit 228 is designed so that the charge crosstalk component is sufficiently small. For example, a wall that prevents charge transfer is provided between different pixel circuits 228, and hence mixing of colors can be reduced. However, it is difficult to completely prevent transfer of charges.

Therefore, in the present embodiment, as will be described in detail later, a mixed color component from a pixel group whose image data is not required is suppressed to improve the quality of an image obtained from a required pixel group.

Next, deterioration in image quality due to noise propagation (circuit crosstalk) between circuits will be described.

Figure 7:
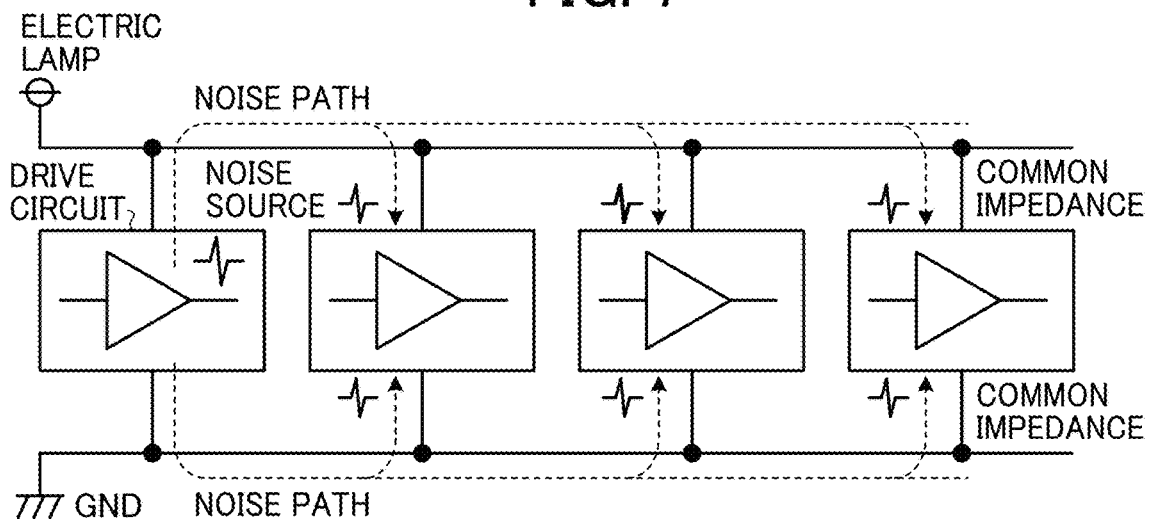
FIG. 7 illustrates noise propagation (circuit crosstalk) between circuits.

FIG. 7 illustrates noise propagation (circuit crosstalk) between circuits. As illustrated in FIG. 7, when a load variation occurs due to a switching operation or the like of a certain circuit, the level of a power supply that supplies a current to the certain circuit or a GND varies. The variation of the power supply or the GND propagates as noise to another circuit that shares the power supply or the GND of the certain circuit through common impedance.

Therefore, in the present embodiment, as will be described in detail later, generation of noise caused by a circuit for processing a non-required pixel group is suppressed, and noise propagation to data obtained from a required pixel group is suppressed, thereby improving the quality of an image obtained from the required pixel group.

Next, deterioration in image quality due to noise propagation (wiring crosstalk) between circuits will be described.

Figures 8, 9:
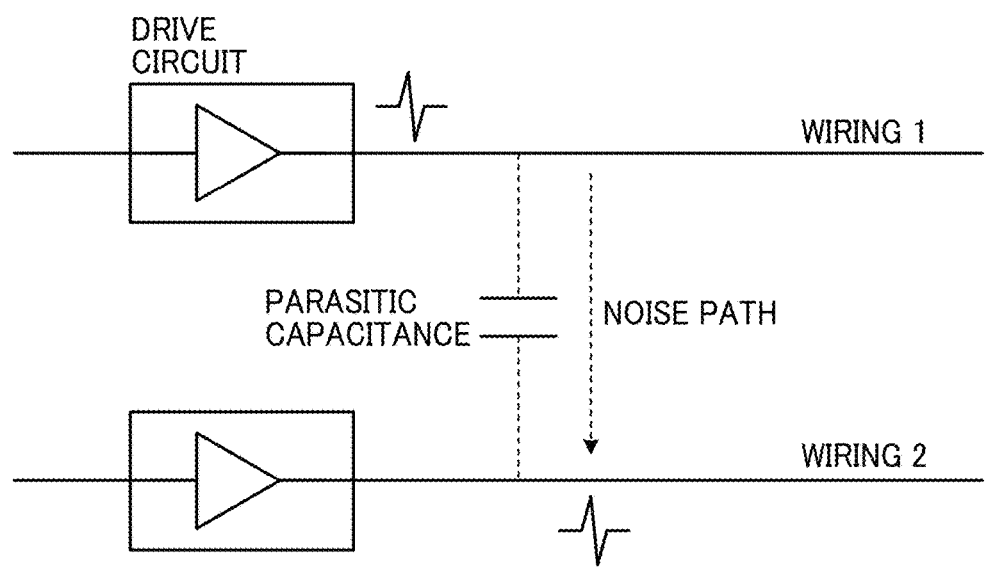
FIG. 8 illustrates noise propagation (wiring crosstalk) between circuits.
FIG. 9 illustrates control timing of pixel circuits.

FIG. 8 illustrates noise propagation (wiring crosstalk) between circuits. As illustrated in FIG. 8, when two signal lines are arranged close to each other in parallel, noise propagates through parasitic capacitance or mutual inductance between the wiring (signal lines). A change in level generated in one wiring (one signal line) is propagated to the other wiring (the other signal line) as noise. That is, when wiring 1 is at a fixed level, no noise propagation occurs even though there is a wiring crosstalk propagation path such as parasitic capacitance.

Thus, in the present embodiment, as will be described in detail later, signal wiring related to processing on a non-required pixel group is controlled to a fixed level, and noise propagation between the wiring is suppressed, thereby improving the quality of an image obtained from a required pixel group.

Next, control timing of pixel circuits 228 in this embodiment will be described. In the following, a case where the pixel circuits 228 are arranged for four lines (Line0 to Line3) will be described. Lines of pixel groups whose image data is to be acquired are referred to as required lines (Line0 to Line2), and a line of a pixel group whose image data is not required is referred to as a non-required line (Line3).

FIG. 9 illustrates control timing of pixel circuits 228. As illustrated in FIG. 9, the controller 222 performs the control described with reference to FIG. 5 on the pixel circuits 228 arranged in the required lines (Line0 to Line2) to obtain image data.

In contrast, as illustrated in FIG. 9, the controller 222 normally asserts the RT signal and the TX signal for the pixel circuit 228 arranged in the non-required line (Line3).

Since the TX signal is normally asserted, the charge generated through photoelectric conversion by the pixel circuit 228 arranged in the non-required line (Line3) is transferred to the FD 204 immediately after the charge is generated. In addition, since the RT signal is normally asserted, the FD 204 is normally kept at a constant potential. That is, the charge generated through photoelectric conversion is immediately discarded to the power supply via the RT_Tr 206.

By this control, the charge generated in the non-required line (Line3) is normally discarded, and the reading control is not performed. More particularly, although photoelectric conversion is performed in the pixel circuit 228, the charge generated through photoelectric conversion is immediately discarded, hence the charge is not accumulated in the PD 200, and the charge crosstalk component from the non-required line to the required line can be minimized. That is, the charge crosstalk between the pixel circuits 228 can be reduced, and image quality can be improved.

In addition, since the state of the transistor for driving the pixel circuit 228 arranged in the non-required line (Line3) is fixed, the load variation caused by the switching operation of the transistor is suppressed, and it is possible to suppress the occurrence of excessive circuit crosstalk through the common impedance. That is, since the switching operation of the transistor is not performed in the pixel circuit 228 arranged in the non-required line (Line3), the circuit crosstalk can be suppressed and power consumption can be reduced.

In addition, since the potential of the FD 204 is normally constant, the level of the processing wiring of the non-required line (Line3) is normally at a predetermined level (reset level), and thus it is possible to minimize a wiring crosstalk component to the required lines (Line0 to Line2) of the pixel section 221 and the processing wiring. That is, since the level of the wiring from the pixel circuit 228 does not vary, the wiring crosstalk can be suppressed.

In addition, the controller 222 controls the AD converter 224 and the digital signal processor 225 as follows.

The controller 222 performs the same control as in related art for the required lines (Line0 to Line2) to obtain image data.

In contrast, the controller 222 stops the operations of the AD converter 224 and the digital signal processor 225 for the non-required line (Line3).

In this manner, by stopping the operation of the processor (the AD converter 224 and the digital signal processor 225) of the non-required line (Line3), it is possible to suppress the load variation due to the switching operation of the circuit. That is, it is possible to minimize a circuit crosstalk component from the processor (the AD converter 224 and the digital signal processor 225) of the stopped non-required line (Line3) to the processors of the operating required lines (Line0 to Line2). That is, since the non-required circuit operation is not performed, the circuit crosstalk can be suppressed.

In addition, by stopping the operation of the processor (the AD converter 224 and the digital signal processor 225) of the non-required line (Line3), the potential of the wiring for connection between the processors can be fixed to a predetermined level, and thus the wiring crosstalk component to the wiring for connection between the processors of the required lines (Line0 to Line2) can be minimized. That is, since the level of the wiring between the processors does not vary, the wiring crosstalk can be suppressed.

Furthermore, by fixing the control signal or stopping the processor of the non-required line (Line3), power consumption can be reduced.

As described above, according to the present embodiment, the charge is normally reset and the reading control is not performed for the non-required pixel region whose image data is not required. Thus, it is possible to reduce transfer of the charge generated through photoelectric conversion in the non-required pixel region or transfer of the noise caused by the operation of the processing circuit for image data obtained from the non-required pixel region to the required pixel region, and it is possible to improve the quality of an image obtained from pixels in the required line whose image data is required.

Furthermore, by stopping each processor of the non-required line whose image data is not required within a range in which demanded image quality can be satisfied, power consumption can be reduced.

For example, when it is required to acquire a visible image captured through irradiation with visible light of such as RGB and it is not required to acquire an invisible image captured through irradiation with invisible light such as NIR, the charge crosstalk from the non-required line (Line3) to the required lines (Line0 to Line2) can be reduced.

Second Embodiment

Next, a second embodiment will be described.

In the first embodiment, the control of the controller 222 in the case of setting the required pixel group or the non-required pixel group in units of lines has been described. The second embodiment differs from the first embodiment in that the required pixel group and the non-required pixel group are set in the same line. In the following, descriptions of the configurations of the second embodiment similar to those in the first embodiment will be omitted, and features of the second embodiment different from those of the first embodiment will be described.

Figure 10:
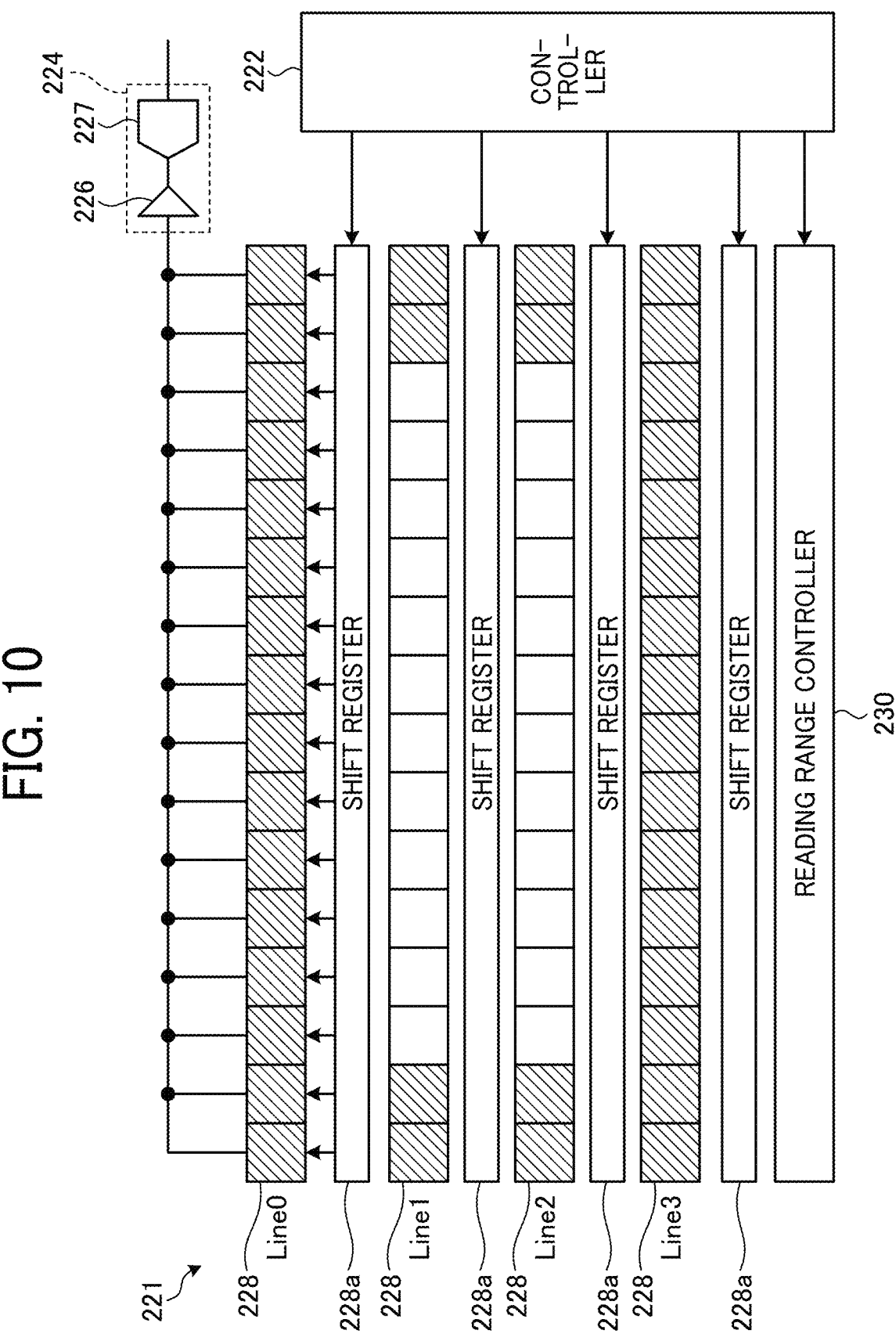
FIG. 10 illustrates an example of partial reading of a pixel group according to a second embodiment.

FIG. 10 illustrates an example of partial reading of a pixel group according to the second embodiment. FIG. 10 illustrates control switching of the pixel circuits 228 in units of pixel groups in the same line. The example illustrated in FIG. 10 presents control in the case of reading a pixel group arranged at the center of pixel circuits 228 arranged in a matrix.

Note that in FIG. 10, a pixel group indicated by shading corresponds to at least one pixel that is not to be read in the pixel section 221. The at least one pixel that is not to be read represents one pixel or a plurality of pixels.

The solid-state imaging element 22 includes a reading range controller 230. The controller 222 specifies, for the reading range controller 230, a pixel range (a range from a reading start pixel position to a reading end pixel position) in which reading is performed in pixel circuits 228 of the pixel section 221. The reading range controller 230 controls a shift register circuit 228a provided for pixel circuits 228 in each line (Line0 to Line3) of the pixel section 221.

The shift register circuit 228a sequentially applies the TX, RT, and SL signals (pixel control signals) input from the controller 222 to each pixel in the range from the reading start pixel position to the reading end pixel position set by the reading range controller 230. The control signals input from the controller 222 to the shift register circuit 228a are input at the same timing as the control timing illustrated in FIG. 5.

The shift register circuit 228a controls the TX and RT signals (pixel control signals) to fixed levels for pixels outside the reading range not set by the reading range controller 230. Since the shift register circuit 228a is not required to transfer the signals obtained from the pixels outside the reading range to the AMP circuit 226 and the AD conversion circuit 227 provided in the subsequent stage, the SL signal is also controlled to a fixed level. That is, all the control signals from the shift register circuit 228a to the pixel group that is indicated by shading in FIG. 10 and that is not to be read are set to fixed levels.

That is, the shift register circuit 228a normally sets the output to a fixed level and does not perform reading for Line0 and Line3 that include the pixel groups indicated by shading in FIG. 10 and that are not to be read. In addition, the shift register circuit 228a sets the output to a fixed level and does not perform reading for the pixel groups that are indicated by shading and that are positioned at the ends of the pixel circuits 228 of Line1 and Line2.

In contrast, the controller 222 controls the output of the shift register circuit 228a, and the shift register circuit 228a reads image data from the pixel groups other than the pixels indicated by shading in FIG. 10.

The reading range controller 230 is not required when partial reading in the same line is not required. When partial reading in the same line is not required, the controller 222 may switch between the control signal to the shift register circuit 228a of the required line in which reading is performed and the control signal to the shift register circuit 228a of the non-required line in which reading is not performed.

As described above, according to the present embodiment, even when the required pixel group and the non-required pixel group are set in the same line, the controller 222 performs control switching of the pixel circuits 228 in units of pixel groups, thereby obtaining an effect of reducing the charge crosstalk.

In addition, since the controller 222 does not perform each processing operation related to reading of the non-required pixel group in the same line, the circuit crosstalk or the wiring crosstalk can be reduced.

Furthermore, since the controller 222 does not perform each processing operation related to reading of the non-required pixel group, it is possible to reduce the time required to acquire image data. Alternatively, the controller 222 can decrease the processing speed of each processing operation related to reading of the required pixel group.

Third Embodiment

Next, a third embodiment will be described.

The third embodiment differs from the first embodiment or the second embodiment in that the pixel circuit 228 does not include the charge transfer switch (TX_Tr) 202 but has a three-transistor configuration. In the following, descriptions of the configurations similar to those in the first embodiment or the second embodiment will be omitted, and features of the third embodiment different from those of the first embodiment or the second embodiment will be described.

Figure 11:
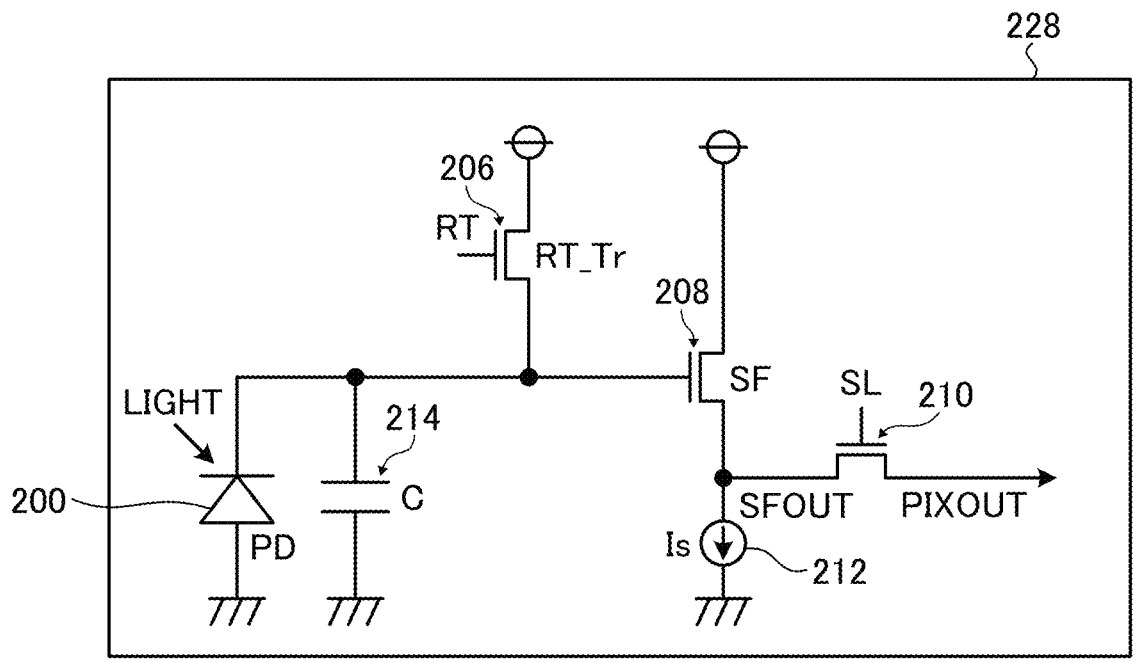
FIG. 11 illustrates a configuration example of a pixel circuit according to a third embodiment.

FIG. 11 illustrates a configuration example of a pixel circuit 228 according to the third embodiment. The pixel circuit 228 according to the third embodiment does not include the charge transfer switch (TX_Tr) 202 and has a three-transistor configuration including a capacitor 214. The capacitor 214 is provided between the PD 200 and the RT_Tr 206.

The charge generated in the PD 200 is accumulated in the capacitor 214. A potential difference (hereinafter, referred to as signal level) corresponding to the amount of generated charge is generated at an end of the capacitor 214. The capacitor 214 is reset by the RT_Tr 206. The reset operation is controlled with an RT signal from the controller 222.

Timing control for transfer will be described below. For easier understanding, it is assumed that four lines of the pixel circuits 228 are arranged in a matrix.

Figure 12:
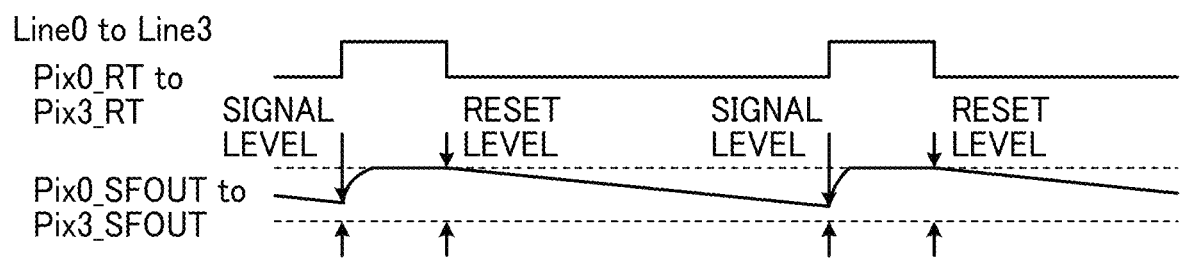
FIG. 12 illustrates timing control for transfer in pixel circuits.

FIG. 12 illustrates timing control for transfer in pixel circuits 228. As illustrated in FIG. 12, the controller 222 performs control using each RT signal at a predetermined reading interval (hereinafter, referred to as line period).

The photoelectric conversion in the PD 200 is normally performed. The charge generated in the PD 200 is accumulated in the capacitor 214.

The controller 222 reads the signal level at the reading timing of the photoelectric conversion result, and asserts each RT signal after reading the signal level.

When the RT signal is asserted, the terminal potential of the capacitor 214 is initialized to a predetermined potential (hereinafter, referred to as reset level). The difference between the reset level and the signal level is the amount of charge generated through photoelectric conversion, that is, the intensity of light after the photoelectric conversion. The reset level and the signal level are amplified by the SF circuit 208 and output as SFOUT.

When the SL signal is asserted, the level amplified by the SF circuit 208 is transferred to the AD converter 224 disposed in the subsequent stage.

Next, control timing of pixel circuits 228 in this embodiment will be described.

Figure 13:
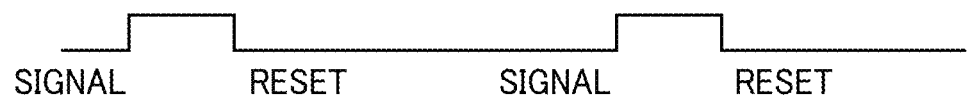
FIG. 13 illustrates control timing of the pixel circuits.
Figure 13:
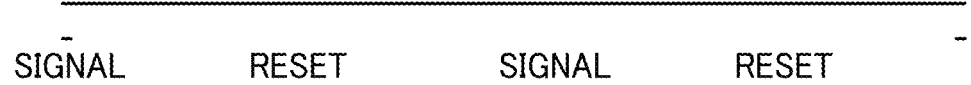
Figure 13:

FIG. 13 illustrates control timing of the pixel circuits 228. As illustrated in FIG. 13, the controller 222 performs the control described with reference to FIG. 5 for the pixel circuits 228 arranged in the required lines (Line0 to Line2) to obtain image data.

In contrast, as illustrated in FIG. 13, the controller 222 normally asserts the RT signal for the pixel circuit 228 arranged in the non-required line (Line3).

Since the RT signal is normally asserted, the charge generated through photoelectric conversion by the pixel circuit 228 arranged in the non-required line (Line3) is immediately discarded to the power supply via the RT_Tr 206 even though the charge is generated through photoelectric conversion.

By this control, the charge generated in the non-required line (Line3) is normally discarded. More particularly, although photoelectric conversion is performed in the pixel circuit 228, the charge generated through photoelectric conversion is immediately discarded, and hence the charge crosstalk component from the non-required line to the required line can be minimized.

In addition, since the state of the transistor for driving the pixel circuit 228 arranged in the non-required line (Line3) is fixed, the load variation caused by the switching operation of the transistor is suppressed, and it is possible to suppress the occurrence of excessive circuit crosstalk through the common impedance.

In addition, since the potential of the FD 204 and the SFOUT potential are normally constant, the level of the processing wiring of the non-required line (Line3) is normally at a predetermined level (reset level), and thus it is possible to minimize the wiring crosstalk component to the processing wiring of the required lines (Line0 to Line2).

In addition, the controller 222 controls the AD converter 224 and the digital signal processor 225 as follows.

The controller 222 performs the same control as in related art for the required lines (Line0 to Line2) to obtain image data.

In contrast, the controller 222 stops the operations of the AD converter 224 and the digital signal processor 225 for the non-required line (Line3).

In this manner, by stopping the operation of the processing circuit (the AD converter 224 and the digital signal processor 225) of the non-required line (Line3), it is possible to suppress the load variation due to the switching operation of the circuit. That is, it is possible to minimize the circuit crosstalk component from the processing circuit (the AD converter 224 and the digital signal processor 225) of the stopped non-required line (Line3) to the processing circuits of the operating required lines (Line0 to Line2). That is, since the non-required circuit operation is not performed, the circuit crosstalk can be suppressed.

In addition, by stopping the operation of the processing circuit (the AD converter 224 and the digital signal processor 225) of the non-required line (Line3), the potential of the wiring for connection between the processing circuits can be fixed to a predetermined level, and thus the wiring crosstalk component to the wiring for connection between the processing circuits of the required lines (Line0 to Line2) can be minimized. That is, since the level of the wiring between the processing circuits does not vary, the wiring crosstalk can be suppressed.

Furthermore, by fixing the control signal or stopping the processing circuit of the non-required line (Line3), power consumption can be reduced.

As described above, according to the present embodiment, the charge is normally reset and the reading control is not performed for the non-required pixel region whose image data is not required. Thus, it is possible to reduce transfer of the charge generated through photoelectric conversion in the non-required pixel region or transfer of the noise caused by the operation of the processing circuit for image data obtained from the non-required pixel region to the required pixel region, and it is possible to improve the quality of an image obtained from pixels in the required line whose image data is required.

Note that in this embodiment, control in the case of setting a required pixel group or a non-required pixel group in units of lines has been described, but even in the case of setting a required pixel group and a non-required pixel group in the same line, the controller 222 can obtain the effect of reducing the charge crosstalk by switching control of the pixel circuits 228 in units of pixel groups.

In addition, since the controller 222 does not perform each processing operation related to reading of the non-required pixel group in the same line, the circuit crosstalk or the wiring crosstalk can be reduced.

Furthermore, since the controller 222 does not perform each processing operation related to reading of the non-required pixel group, it is possible to reduce the time required to acquire image data. Alternatively, the controller 222 can decrease the processing speed of each processing operation related to reading of the required pixel group.

Note that means similar to the means described in the second embodiment can be applied to control switching of the pixel circuits 228 in units of pixel groups.

Furthermore, by stopping each controller and processing circuit of the non-required line whose image data is not required within a range in which demanded image quality can be satisfied, power consumption can be reduced.

In any one of the first embodiment to the third embodiment, the different color filters 229 are arranged in the pixel circuits 228 arranged in the respective lines. For example, in the case of three lines, the RGB-CF are arranged. In this way, various color filters 229 may be arranged depending on the purpose of use. In any case, it is expected that images of not all lines are required.

For example, when the RGB-CF are disposed as the color filters 229, since the wavelength of R is the longest, the charge crosstalk from the pixel circuit 228 provided with the R-CF to the pixel provided with the G-CF or the B-CF increases. For example, when an image of G is required, to reduce the influence due to the charge crosstalk from the non-required line to the required line, the control for the pixel circuit 228 provided with the R-CF having the maximum wavelength is switched to the control described in any one of the first embodiment to the third embodiment, and the charge crosstalk from the pixel circuit 228 provided with the R-CF is reduced. Accordingly, noise to the required line can be reduced. That is, crosstalk can be reduced by not reading a pixel group in which the charge crosstalk is large.

Fourth Embodiment

Next, a fourth embodiment will be described.

In the fourth embodiment, the arrangement position of the AD converter 224 is different from those in any one of the first embodiment to the third embodiment. In the following, descriptions of the configurations similar to those in any one of the first embodiment to the third embodiment will be omitted, and features of the fourth embodiment different from those of any one of the first embodiment to the third embodiment will be described.

Figure 14:
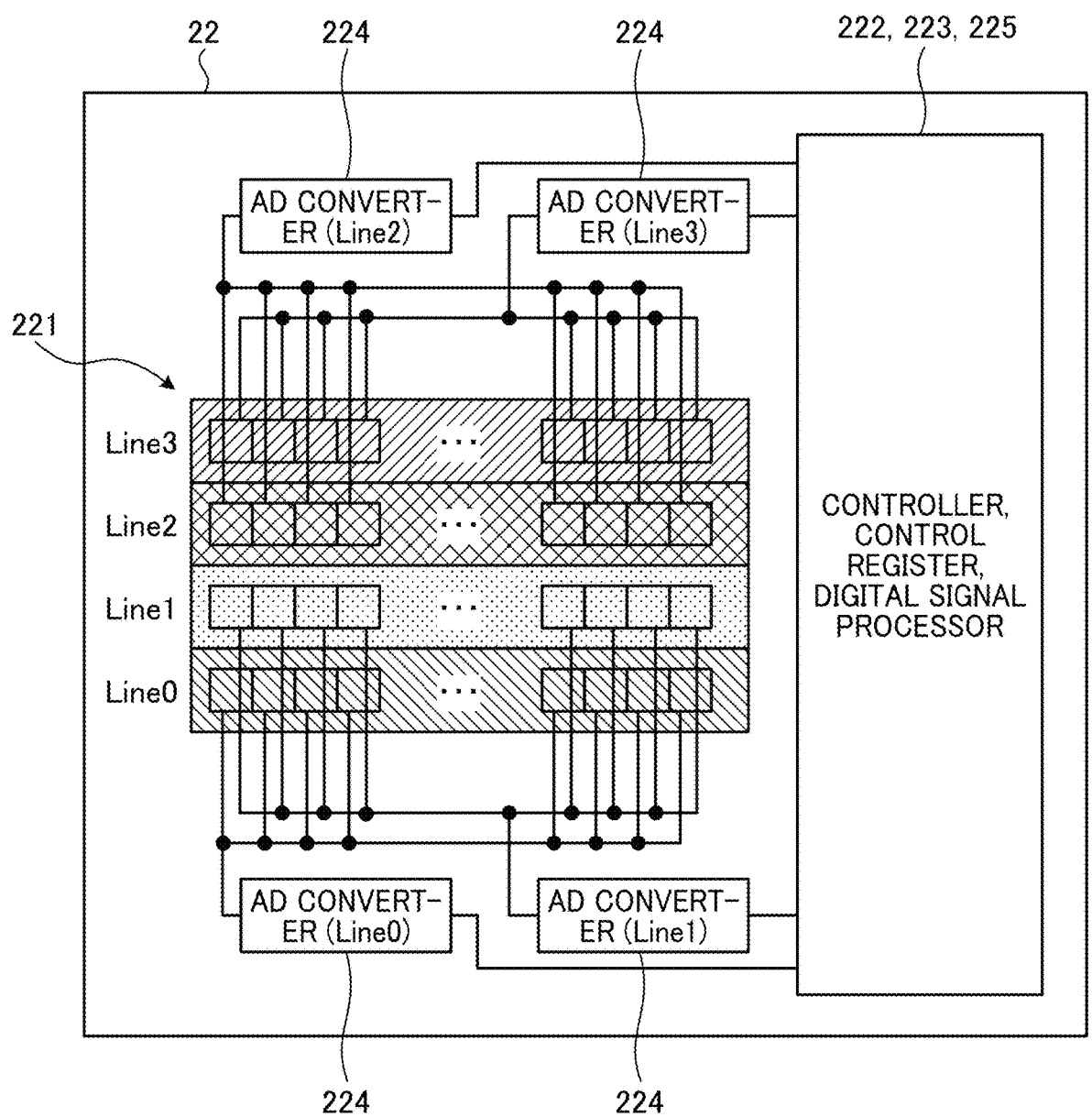
FIG. 14 is a block diagram illustrating electric connection of respective components constituting a solid-state imaging element according to a fourth embodiment.

FIG. 14 is a block diagram illustrating electric connection of respective components constituting a solid-state imaging element 22 according to the fourth embodiment. As illustrated in FIG. 14, in the solid-state imaging element 22, two AD converters 224 are arranged on each of the upper and lower sides of the pixel section 221 including four lines. The AD converters 224 arranged above or below the pixel section 221 process signals obtained from the pixel section 221 of two lines out of four lines.

When image data for two lines (Line0 and Line1) is required, the controller 222 controls the AD converters (Line2 and Line3) 224 to be partially stopped. Thus, noise generated in the AD converters (Line2 and Line3) 224 can be suppressed. Further, the circuit crosstalk components to the pixel section 221 or the AD converters (Line0 and Line1) 224 can be suppressed.

When image data for two lines (Line0 and Line2) is required, the controller 222 stops the AD converters (Line1 and Line3) 224. Thus, noise generated in the AD converters (Line1 and Line3) 224 can be suppressed. As described above, the circuit crosstalk components to the pixel section 221 or the AD converters (Line0 and Line2) 224 can be suppressed. However, noise components caused by the circuit crosstalk to the pixel section 221 have a distribution. In this embodiment, the left side of the pixel section 221 is affected by noise from the AD converters 224, and the right side of the pixel section 221 is less affected by noise.

Figure 15:
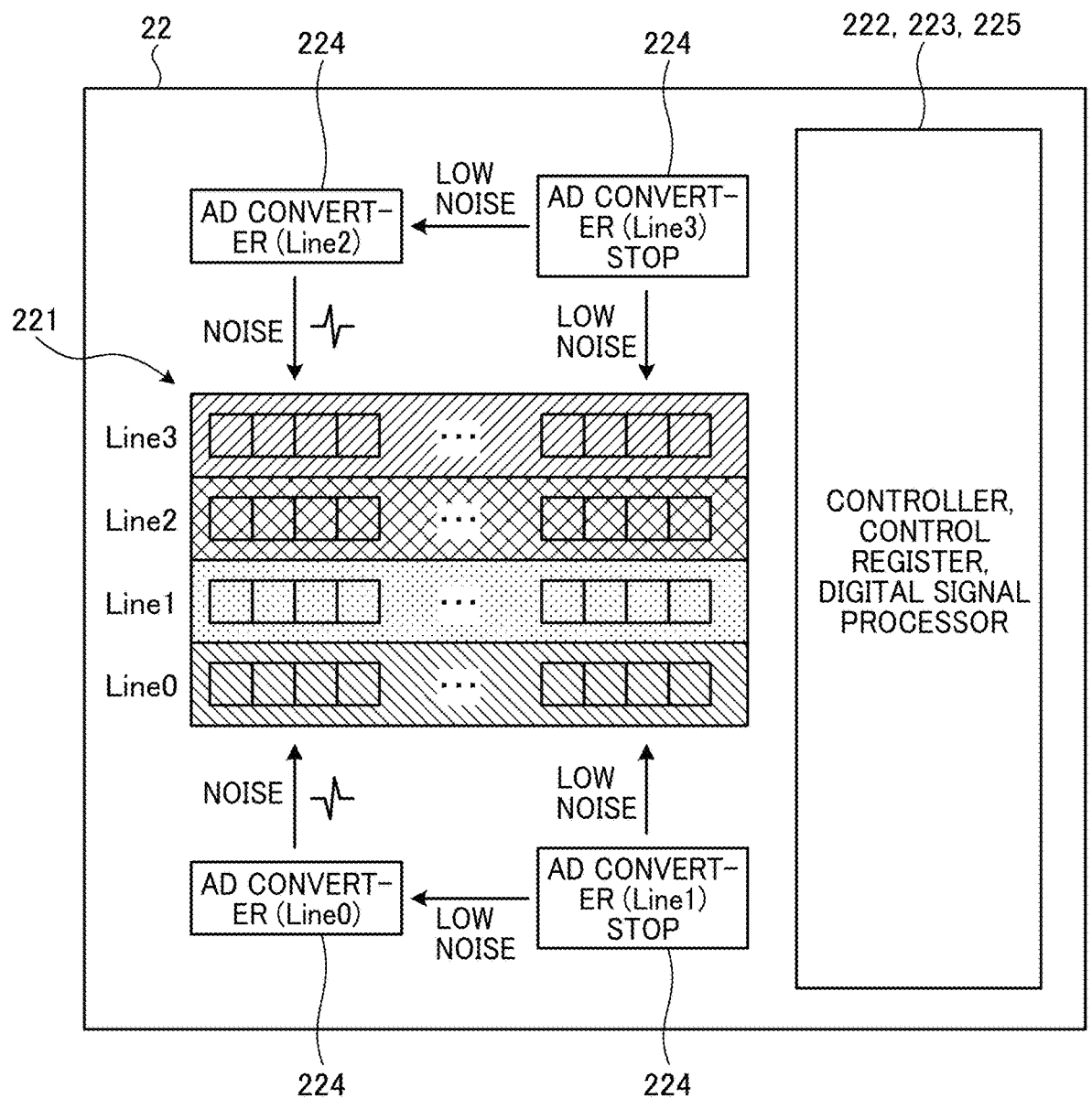
FIG. 15 illustrates influence of noise (circuit crosstalk) when AD converters (Line1 and Line3) are stopped.

FIG. 15 illustrates the influence of noise (circuit crosstalk) between the AD converters 224 and from the AD converters 224 to the pixel section 221 when the AD converters (Line1 and Line3) 224 are stopped. In FIG. 15, signal wiring is not illustrated.

When the influence of noise on image quality is small, it may be desirable in terms of image quality that the influence of noise to the pixel section 221 is uniform. In consideration of such a case, in this embodiment, the control register 223 can selectively turn on/off the control suppress function of the AD converter 224 or the digital signal processor 225, and can partially stop, for example, the digital signal processor 225. In particular, it is possible to partially operate the processor close to the pixel section 221 having a large influence on image quality.

In the configuration illustrated in FIG. 14, when image data for two lines (Line0 and Line2) is required, the control register 223 operates all four AD converters (Line0 to Line3) 224. The amount of propagation of noise from the AD converter 224 is not extremely biased with respect to the pixel groups constituting the line, and an image having uniform quality can be obtained regardless of the arrangement positions of the pixels. That is, the noise distribution can be made uniform.

As described above, according to this embodiment, it is possible to control the influence of noise and obtain desired image quality by intentionally partially operating non-required circuits. In addition, power consumption can be reduced by stopping the non-required circuits.

In one or more embodiments described above, it is possible to increase the quality of an image generated based on a group of pixels corresponding to image data, such as a group of pixels that are required for image data.

In each of the embodiments described above, an example is described in which the image processing apparatus of the present disclosure is applied to a multifunction peripheral having at least two functions of a copy function, a print function, a scan function, and a facsimile function. However, the image processing apparatus of the present disclosure can be applied to an image processing apparatus that is any one of a copier, a printer, a scanner, and a facsimile apparatus.

Although the above embodiments have been described, the specific configuration of each unit, the content of processing, and the format of data are not limited to those described in the embodiments.

For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A solid-state imaging element comprising:
a pixel section including a plurality of pixels that are arranged in a matrix and configured to perform photoelectric conversion; and
circuitry configured to perform reading control on pixels in the pixel section,
wherein the circuitry is configured not to perform reading control on at least one pixel included in the pixel section by setting control signal lines of the at least one pixel to a predetermined constant level.

2. The solid-state imaging element according to claim 1, wherein the pixel section includes a plurality of pixel groups provided with a plurality of color filters configured to transmit light in a plurality of different specific wavelength ranges, and
wherein the at least one pixel included in the pixel section on which the reading operation is not performed serves as a pixel group provided with a specific color filter among the plurality of pixel groups.

3. The solid-state imaging element according to claim 2, wherein the specific color filter is a color filter configured to transmit light in a maximum wavelength band among the plurality of color filters for the plurality of pixel groups included in the pixel section.

4. The solid-state imaging element according to claim 2, wherein the specific color filter is a color filter configured to transmit light in a near infrared region.

5. The solid-state imaging element according to claim 1, wherein the circuitry discards a charge that is generated in the at least one pixel included in the pixel section on which the reading operation is not performed, to keep an output signal from a pixel group at a fixed level.

6. The solid-state imaging element according to claim 1, further comprising:
at least one processing circuit configured to process a signal obtained from the pixel section,
wherein the circuitry is further configured to stop operation of the at least one processing circuit, so as not to perform processing of a signal obtained from the at least one pixel included in the pixel section.

7. The solid-state imaging element according to claim 1, further comprising:
at least one processing circuit configured to process a signal obtained from the pixel section, so as not to perform processing of a signal obtained from the at least one pixel included in the pixel section.

8. The solid-state imaging element according to claim 7, wherein the circuitry is configured to arbitrarily select control on the at least one pixel included in the pixel section and the at least one processing circuit configured to process the signal that is obtained from the at least one pixel included in the pixel section.

9. A reading device comprising:
a light source configured to emit light; and
the solid-state imaging element according to claim 1.

10. An image processing apparatus comprising:
the reading device according to claim 9; and
an image forming section.

11. The solid-state imaging element according to claim 1, wherein the at least one pixel is disposed in a different line of the matrix than the pixels on which the circuitry performs reading control.

12. The solid-state imaging element according to claim 1, wherein the at least one pixel is disposed in a same line of the matrix as the pixels on which the circuitry performs reading control.

13. The solid-state imaging element according to claim 1 wherein the at least one pixel is configured to capture near infrared light.

14. The solid-state imaging element according to claim 13, wherein the pixels on which the circuitry performs reading control are configured to capture visible light.

15. The solid-state imaging element according to claim 1, wherein the control signal lines of the at least one pixel include a reset signal line.

16. The solid-state imaging element according to claim 15, wherein the control signal lines of the at least one pixel include a charge transfer signal line.

17. The solid-state imaging element according to claim 15, wherein the at least one pixel is in a reset state when the reset signal line is at the predetermined constant level.

18. The solid-state imaging element according to claim 1, wherein the pixels section includes a plurality of lines, and each line including a different color filter to capture a different color.

19. A control method executable by a solid-state imaging element including a pixel section including a plurality of pixels that are arranged in a matrix and configured to perform photoelectric conversion, the method comprising:
  performing reading control on pixels in the pixel section; and
  not performing on at least one pixel included in the pixel section by setting control signal lines of the at least one pixel to a predetermined constant level.

* * * * *